United States Patent [19]

Kirma

[11] Patent Number: 5,105,054
[45] Date of Patent: Apr. 14, 1992

[54] ARRANGEMENT FOR PROTECTION OF ELECTRICAL INSTALLATIONS AGAINST ELECTRICAL DISTURBANCES

[75] Inventor: Safa Kirma, Wedel, Fed. Rep. of Germany

[73] Assignee: Deutsche Airbus GmbH, Hamburg, Fed. Rep. of Germany

[21] Appl. No.: 662,761

[22] Filed: Feb. 28, 1991

Related U.S. Application Data

[63] Continuation-in-part of Ser. No. 516,264, Apr. 30, 1990, abandoned.

[30] Foreign Application Priority Data

May 6, 1989 [DE] Fed. Rep. of Germany ....... 3914930
Oct. 17, 1989 [DE] Fed. Rep. of Germany ....... 3934606
Mar. 13, 1990 [DE] Fed. Rep. of Germany ....... 4007886

[51] Int. Cl.$^5$ .................... H02G 13/00; H05K 9/00
[52] U.S. Cl. ..................... 174/2; 174/35 C; 174/72 A; 174/35 SM
[58] Field of Search ............. 174/2, 6, 35 C, 35 SM, 174/36, 71 R, 72 R, 72 A, 78, 136, DIG. 8; 123/143 C, 633; 361/216, 218; 439/34, 502, 610, 623

[56] References Cited

U.S. PATENT DOCUMENTS 2,123,162  7/1938  Stone ................. 174/35 SM X
3,711,633  1/1973  Ghirardi et al. ......... 174/72 A X

FOREIGN PATENT DOCUMENTS 3421624  12/1985  Fed. Rep. of Germany ... 174/72 A
52-25290  2/1977  Japan .................. 174/DIG. 8
527641  10/1940  United Kingdom .......... 174/35 C
555749  9/1943  United Kingdom .......... 174/35 C
2080010  1/1982  United Kingdom ......... 174/35 SM

OTHER PUBLICATIONS

Advertisement entitled "Okoloom", *American Institute of Electrical Engineers Journal,* Mar. 1922, page number unknown.

*Primary Examiner*—Leo P. Picard
*Assistant Examiner*—Bot Ledynh
*Attorney, Agent, or Firm*—Toren, McGeady & Associates

[57] ABSTRACT

For purposes of protecting electrical installations in airplanes against electromagnetic disturbances and especially against overvoltages as can occur for instance as a consequence of a lightning strike, the electrical lines between the individual electrical devices are laid in flexible profiled tubes consisting of electrically conducting material and are rotatably connected with junction elements arranged on one side. At the same time the tubes are connected by means of these junction elements to charge dissipation points provided at the electrical devices. The lines laid in this manner are arranged in overbraiding of plastic material by way of chafing protection. In another embodiment, the chafing protection is provided by a plastic layer on the inside of the profiled tube. In still another embodiment, the chafing protection is itself a hose fabricated of fiber material.

16 Claims, 5 Drawing Sheets

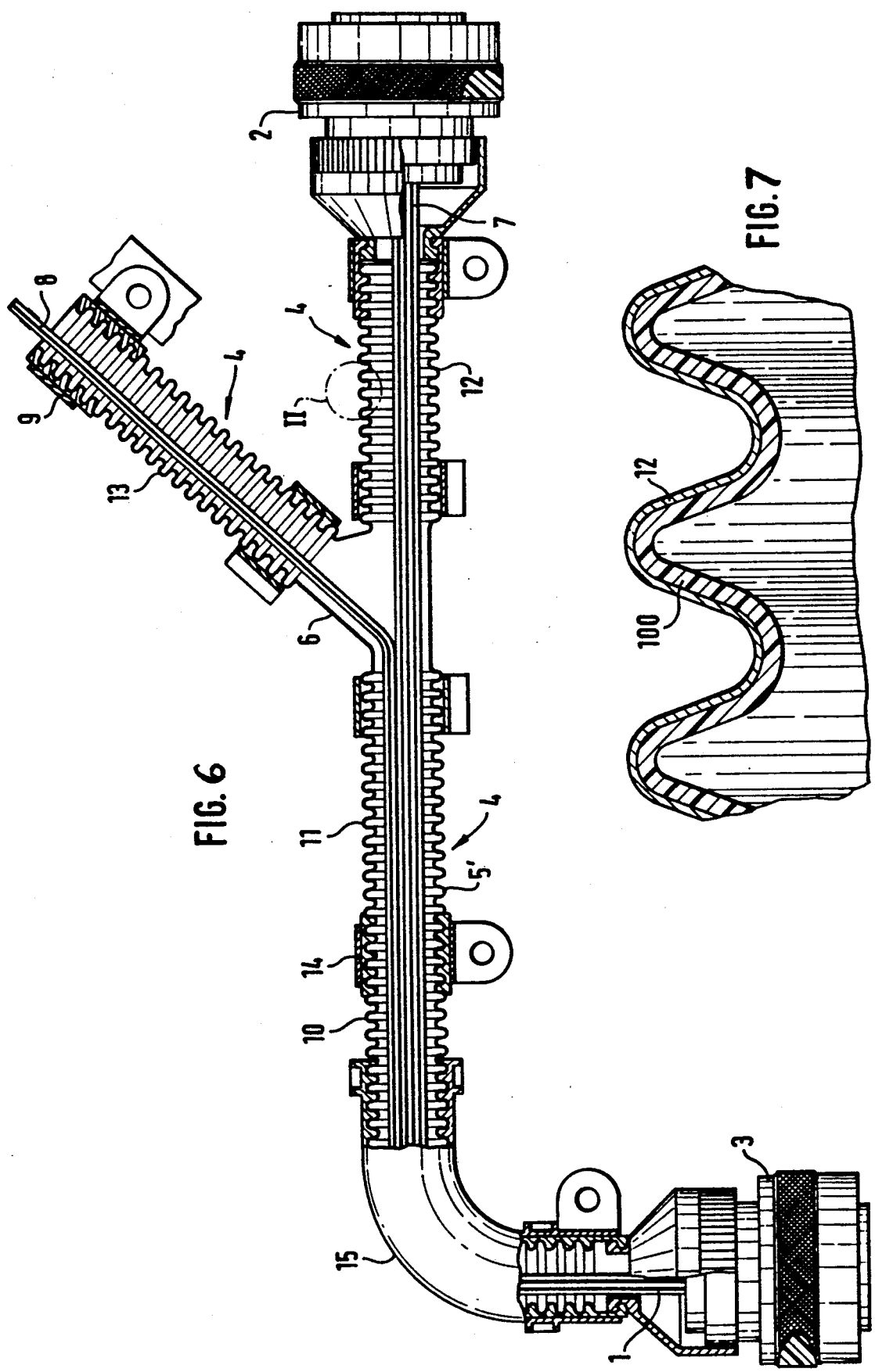

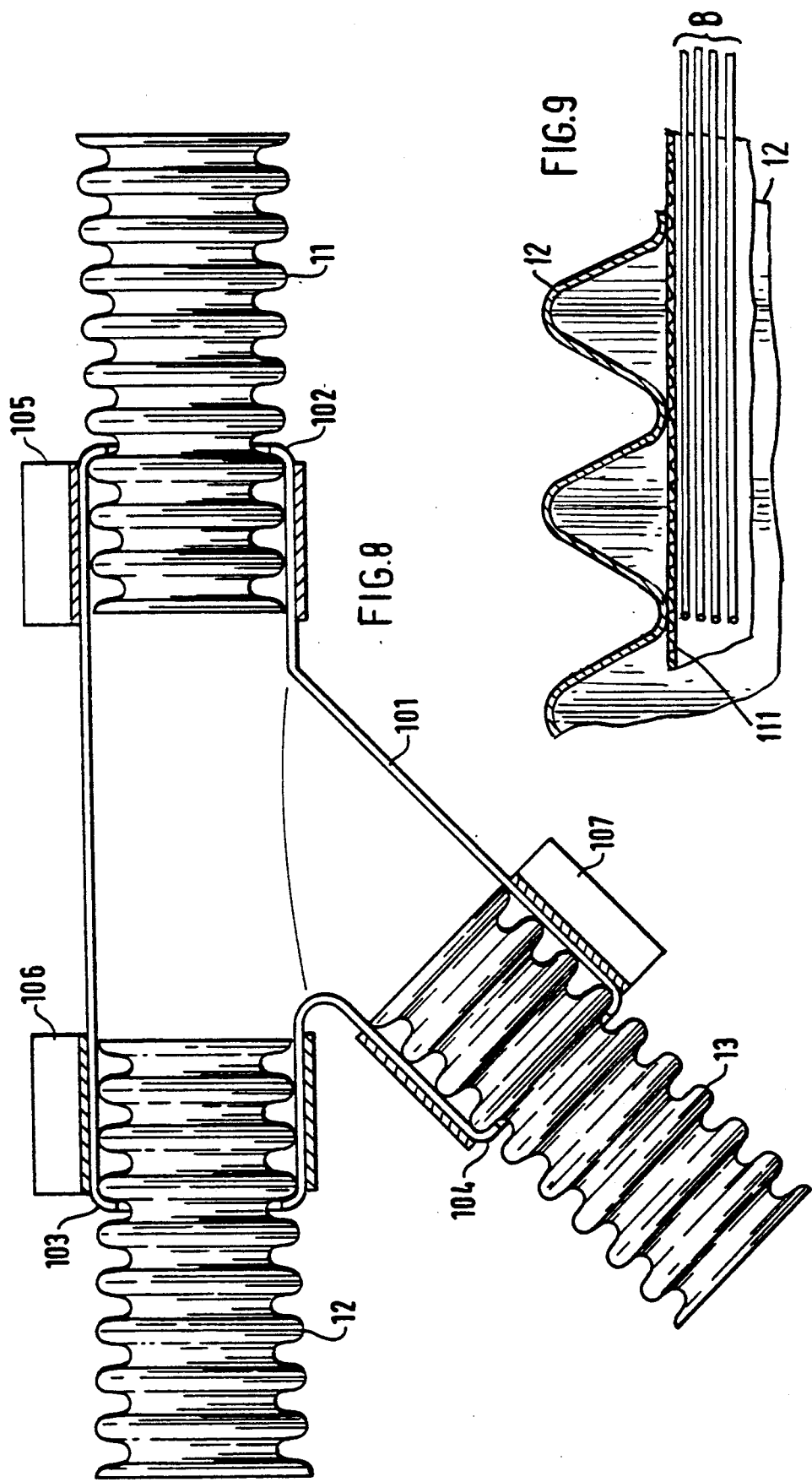

ARRANGEMENT FOR PROTECTION OF ELECTRICAL INSTALLATIONS AGAINST ELECTRICAL DISTURBANCES

CROSS-REFERENCE TO RELATED APPLICATION

This is a continuation-in-part of my earlier filed related application Ser. No. 07/516,264, filed Apr. 30, 1990, now abandoned.

FIELD OF THE INVENTION

The invention is directed to an arrangement for protection of electrical installations against electromagnetic disturbances, especially overvoltages and lightning strikes, and, in particular, to shielding means in the form of metallic profiled tubes which embrace the electrical lines of the cable harness interconnecting the individual electrical apparatus and which are connected in an electrically conducting manner with ground or like charge dissipation points.

BACKGROUND OF INVENTION

Arrangements of this type are especially required in aircraft, where not only large quantities of electrical equipment with very different information signals and disturbance sensitivities are arranged in a relatively confined space and where the possibility of mutual interaction must be reliably eliminated, but also where such electrical equipment is greatly endangered in its safe operation by the effects of a lightning strike on the electronic apparatus.

An already known method is to equip electrical interconnecting cables in aircraft, especially also complete cable harnesses, with shielding made from metallic conducting materials and to connect the shielding respectively at its ends with the housings of the electrical devices or with specially provided leads to ground.

Generally a tube-shaped overbraiding consisting of individual metal strands is utilized for this purpose which, in the case of current carrying contact plugs, is connected with the metallic plug housing at the cable ends. The connection of this overbraiding with provided charge elimination points frequently occurs also by means of separate tube-type clamp fittings, which surround the braiding at the cable ends and from which a separate charge dissipation line, which is also designated as a "pig tail", leads to the charge elimination point.

A disadvantage of the known shielding arrangement is that the used junction and interconnection elements are not only relatively expensive in their fabrication and have a comparatively high inherent weight, but also that additionally their, installation, meaning the establishment of a mechanically and electrically perfect connection with this shielding overbraiding, requires a considerable time expenditure.

SUMMARY OF INVENTION

Therefore, it is a principal object of the invention to provide an arrangement of the previously-mentioned type so as to afford the possibility of assuring this reliable protection, also for the junction and branch-out regions of the lines, while at the same time permitting simple installation.

The above object is achieved in accordance with one aspect of the invention by providing a special sleeve or bushing for embracing the profiled metallic tube and means for clamping same to the metallic tube. The bushing is preferably provided at each junction element of the harness. In addition, means are provided surrounding the electrical lines inside of the metallic tube to protect said electrical lines from chafing or abrasion by the convoluted profile of the surrounding metallic tube.

In accordance with another aspect of the invention, the chafing protection means comprises an overbraid of plastic material surrounding the electrical lines.

In accordance with still another aspect of the invention, the chafing protection means comprises a protective layer on the inside of the profiled tube. This has the advantage over the previous embodiment that the protection against damage to the shielding and lines due to abrasion of the metallic strands from the inwardly projecting ridges, especially during vibration of the aircraft, is achieved at a lower cost and without having to install an additional element.

In accordance with further features of the invention, branching and connector elements, and molded parts for the harness, are provided with inwardly-extending ridges which engage and can be positively clamped to the profiled tube. Several species of the auxiliary elements are described, especially capable of low fabrication costs, and simpler tooling.

Expedient refinements of the foregoing arrangements, which especially serve for further optimization of the protective effect achievable by the arrangement of the invention as well as serving for an extensive simplification of its construction and assembly, will be explained in the description that follows.

Due to the fact that a metal is used as the electrically conducting material to form the flexible profiled tubes in the shielding arrangement in the invention, not only is the aimed-for complete protective effect achieved, but also the possibility exists to realize an especially simple transition or connection between the shielding and the typical plug-in connectors arranged at the harness ends, as well as permitting simple installation of junctions or branches into such cable harnesses.

While the plastic braid constitutes an effective chafing protection, without which the insulation jackets of the electrical lines would rub against the metallic braids of the hose especially in case of vibrations, which would result in line damage, the braiding can generally be used in fabrication only if blanks of appropriate lengths are first prepared from the braiding supplied in the finished state. But, it has been found that the individual fibers of the braiding tend to unravel at the severance faces because of internal prestresses. To overcome this requires specific measures for avoiding the unraveling. Moreover, since pushing together of the braiding leads immediately to an increase of the braiding diameter, it sometimes becomes impossible to introduce the braiding into the profiled hoses. Instead, insertion of the braiding into a profiled hose is only possible by using pulling-in procedures. Furthermore, it was noted that the different plastic materials out of which the braiding can consist have a different behavior when subjected to thermal stresses. Thus, clear reductions in strength result in the common thermoplastic materials, which begin to show already at temperatures of around 100°C.

Thus, a further aspect of the invention has as its main object to overcome this problem with chafing protection means that can be easily melded into the fabrication process, while at the same time the fabrication costs of the lines can be considerably reduced.

In accordance with a feature of this aspect of the invention, the chafing protection means also comprises a hose or tube. Preferably it is fabricated out of a suitable fiber material such that its diameter is stabilized against substantial change when subjected to longitudinal forces. A preferred embodiment uses a braiding formed by knitting or weaving, and impregnated with a binder to stabilize its diameter. It is especially advantageous that the resultant assembly in accordance with this aspect of the invention can be made part of a mass production fabrication process without causing any difficulties.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

BRIEF DESCRIPTION OF THE INVENTION

In the drawings:

FIG. 6 is a view similar to FIG. 1 of a shielded divided or branching cable harness in accordance with another embodiment of the invention;

FIG. 7 shows a detail of the part shown at II in FIG. 6 in accordance with a further embodiment of the invention;

FIG. 8 shows another divided or branching element in accordance with the invention;

FIG. 9 shows the detail II of FIG. 6 in accordance with still a further embodiment of the invention.

DETAILED DESCRIPTION OF PREFERRED EMBODIMENTS

Figure 1:
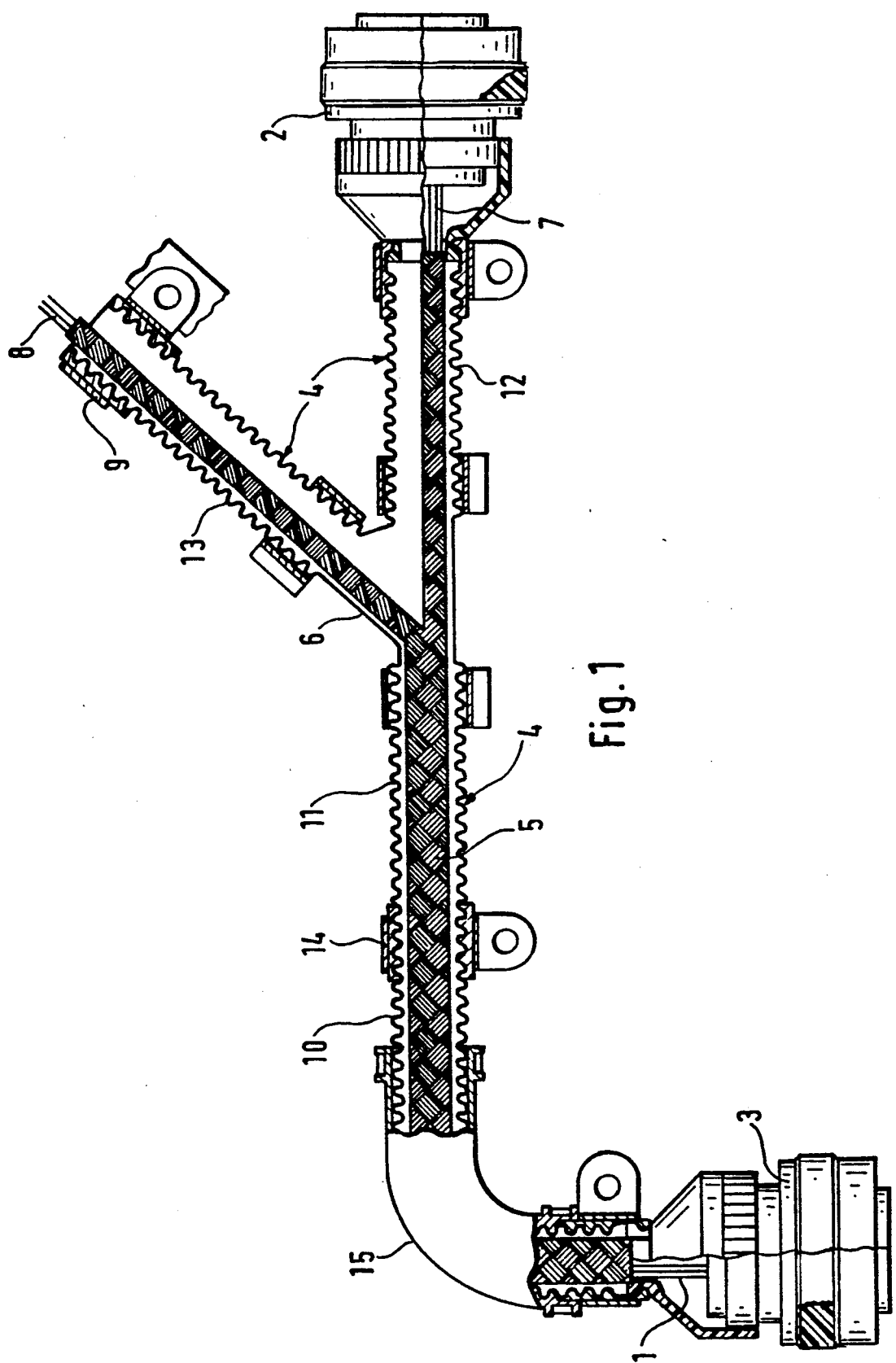
FIG. 1 shows partially in section a divided or branching cable harness provided with a shielding as well as a junction element in accordance with one embodiment of the invention.

Referring now to the drawings wherein similar reference numerals denote like parts throughout, in the shortened arrangement shown in FIG. 1, a cable harness 1, meaning a plurality of electrical cables or lines grouped into a bundle, in the case of the example described here, are laid inside an aircraft between components of its electrical equipment (not shown). The junction of the cable harness 1 with these apparatus occurs at its ends respectively by means of multiple pole plug and socket connectors wherein the construction of the connector elements 2, 3 are explained below in greater detail.

For protection against electromagnetic disturbances, above all overvoltages, as they can occur especially as a consequence of lightning strikes, the cable harness 1 is surrounded by shielding, which consists of a flexible metallic corrugated or profiled tube 4, which in the case of the embodiment examples shown here has a helical ridge and groove structure. In addition, the cable harness 1 is covered with a plastic material overbraiding 5 lying inside the corrugated tube 4 for protection against possible chafing or other mechanical stresses.

As can be seen from the illustration in FIG. 1, the cable harness 1 is subdivided at a branching-out element 6 into two partial strands 7, 8 which run in separate directions, of which the partial strand 8 is only partially shown in the drawing because it passes at this point through a separation not shown in the drawing. An additional junction element 9 is arranged at this point, which serves as a connection to ground or like reference point as well as for fastening the partial strand 8.

It is further discernible that the corrugated tube 4 is composed in its longitudinal direction of several partial elements 10 to 13, of which the elements 10 and 11 are held together by a connector element 14. Finally, a quarter-circle circle shaped molded part or elbow 15 is provided at the end of the corrugated tube 4 on the left in the drawing, which redirects the tube 4 through approximately 90°.

Figure 4:
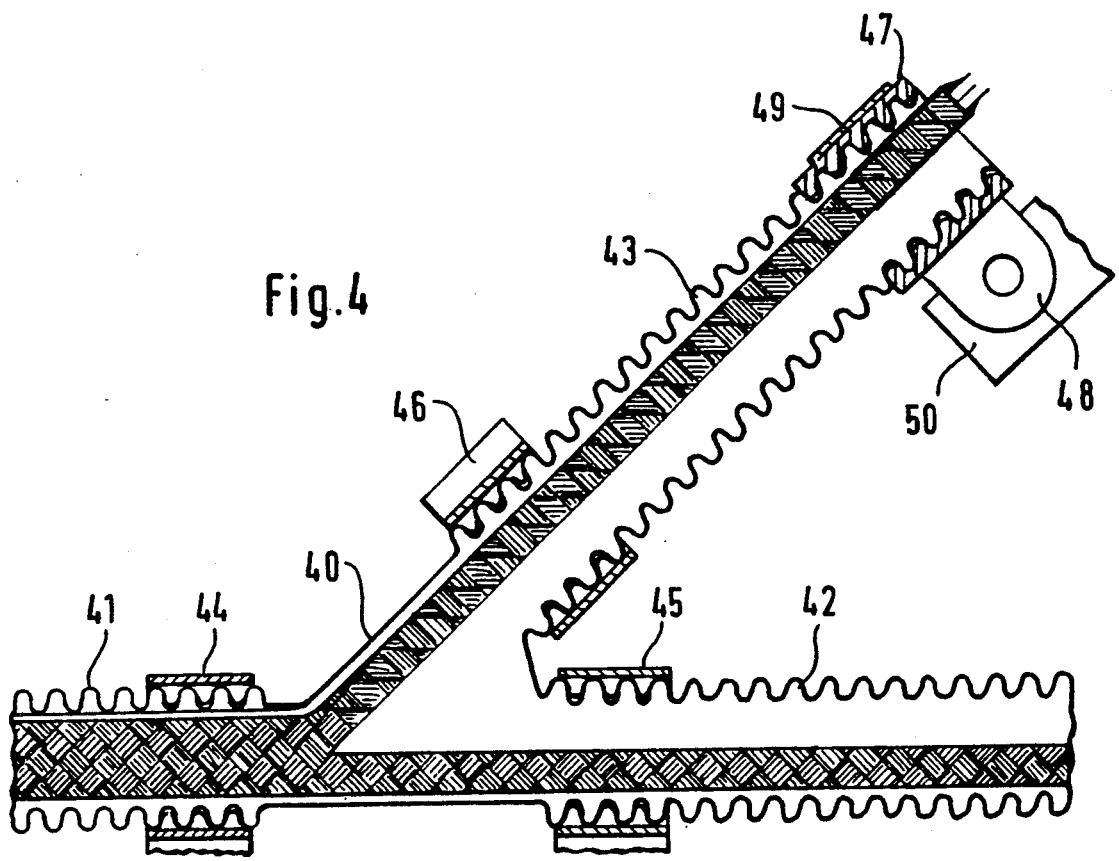
FIG. 4 is an illustration of a detail of a divided region in the cable harness of FIG. 1.

FIG. 4 shows the region of a branch-out or division of a cable harness equipped with a shielding arrangement. In this region the shielding is fastened by a branch-out or dividing element 40, into which the individual segments 41, 42 and 43 of the corrugated tube used as a shielding device are inserted. The corrugated tube has an annular instead of a helical structure in the case of the embodiment example depicted in this figure.

The branch dividing element 40, consisting of metal or of metallized plastic material, is composed of two half cylinders or shells, which are respectively held together at the ends by clamping elements 44 to 46. As is discernible from FIG. 4, the branch dividing element 40 has a profile in its end regions, which is adapted and matched to the corrugated profile of the tube and thus assures a positively locking connection.

The outer end of the partial region 43 of the cable harness or of the shielding is fastened by a junction element 47 designed in two parts held together by a clamp 49 provided with an extension 48. This junction element 47 is fixed to the structure 50 of the airplane by means of this extension 48 which simultaneously provides a connection to the fuselage or ground.

Figure 2:
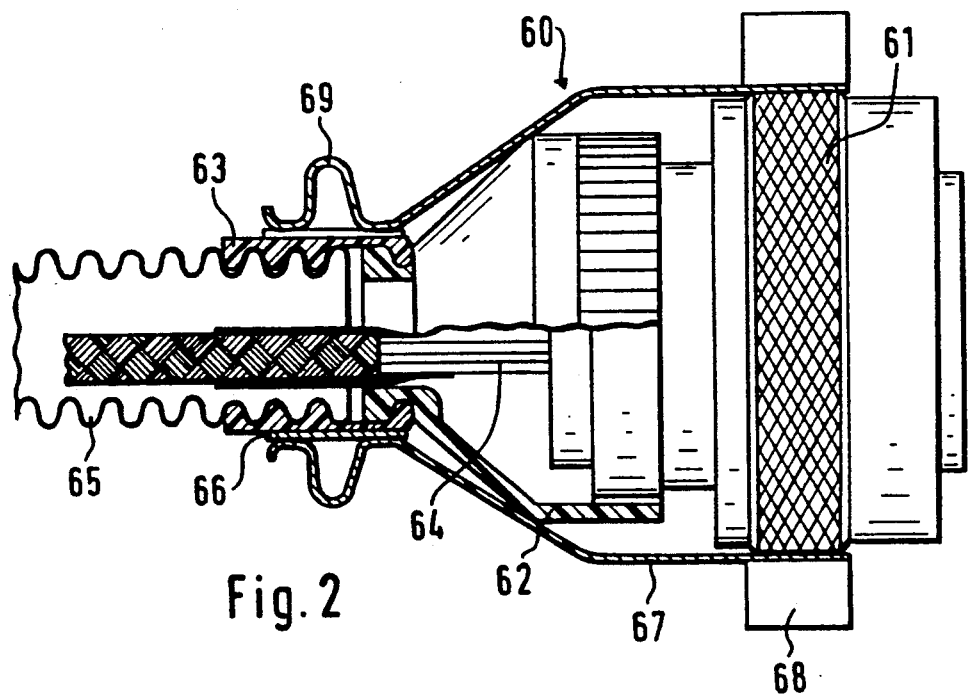
FIGS. 2 and 3 illustrate partially in section additional junction or connector elements for use in the harness of FIG. 1.
Figure 3:
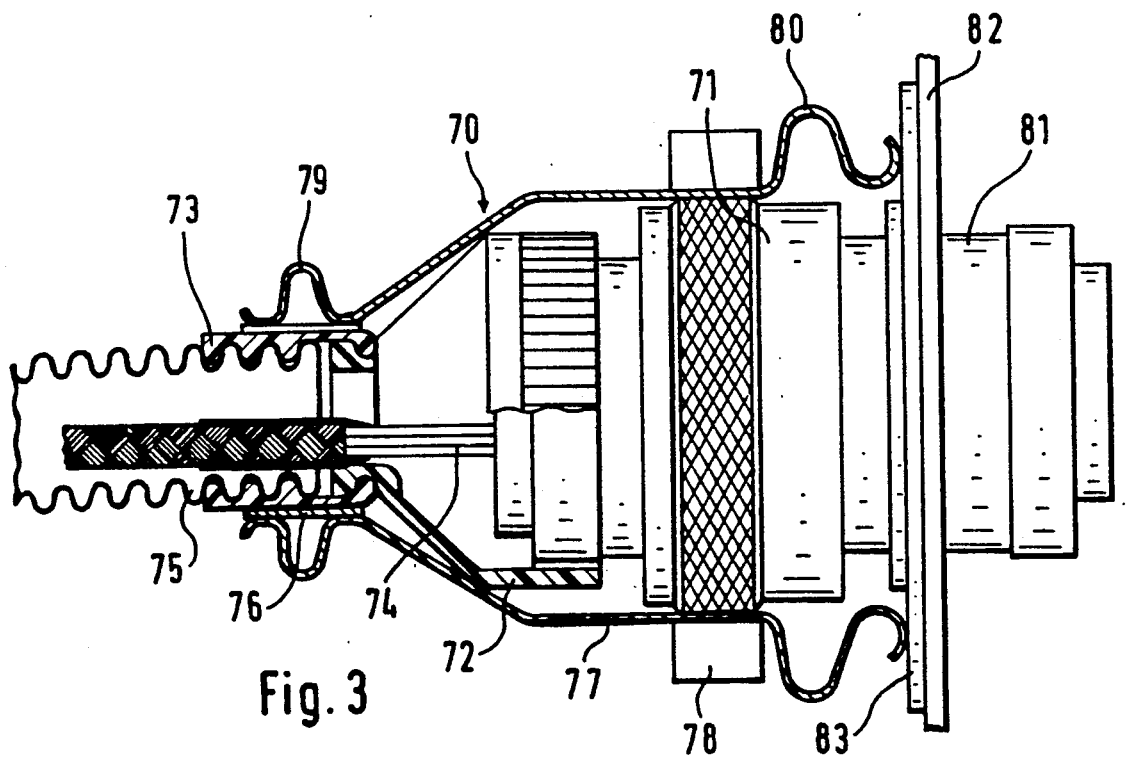

Two junction elements are shown in FIGS. 2 and 3. The junction element 60 shown in FIG. 2 as well as the junction element 70 shown in FIG. 3 are based respectively again on a multiple concentric plug and socket connector, which is latched by means of a coupling ring nut 61 or 71 at the sockets provided for it in the apparatus. Such an apparatus socket 81 is depicted in FIG. 3 in its installation position in an end plate 82 of an electrical apparatus. In both junction elements 60 and 70, the housing, being a coupling ring nut 62 or 72, is respectively supported rotatably in a bushing 63 or 73; these bushings 63 or 73 consist of two half cylinders or shells in the embodiment example shown here, where the metallic corrugated tube 65 or 75 used as shielding of a cable harness 64 or 74 has respectively an annular structure, which two half shells of the bushing are also held together by metallic crimped rings 66 or 76. The inside structure of the bushings 63 and 73 consisting also of metal is also adapted or matched to the outer structure of the corrugated tube 65 or 75 used in this instance.

The coupling ring nuts 62 and 72 of the two junction elements, the plug-in connectors 60 and 70, are respectively enclosed in a metallic hood 67 or 77 whose rearward end is respectively pressed upon the coupling ring nut 61 or 71 by means of a two-lug clamp 68 or 78 engaging upon the outer structure of the coupling nut 61 or 71. In the two hoods 67 and 77, the tube side ends are designed as by slitting to be strip-like by means of longitudinal slots, wherein the strips 69 or 79 rest as individual springs with prestress upon the respective crimped ring 66 or 76.

In the junction element configured as a plug-in connector 70 shown in FIG. 3, the hood 77 is extended beyond the clamp 78 in the direction of the socket 81 in the device and is also in this case subdivided into strip-like individual springs 80 which abut against a contact plate 83. In the two junction elements 60 and 70 the respectively provided hood 67 or 77 assures continuation of the shielding effect and the electrical connection of the tube 65 or 75 also in the region of the junction element. Because of it, the housing 62 or 72 in the form of a coupling ring nut can respectively consist of lightweight plastic material, which thus greatly contributes towards saving weight.

In the case of the junction element 70 in FIG. 3 the coupling ring nut 71 is also made out of plastic material so as to be non-conductive, since in this case the hood 77 provides a continuous connection to ground between the tube 75 and the socket in the device 81. An additional advantage resulting from the use of such a hood can be seen in that a completely closed continuous shielding is provided in this manner since no free, meaning unprotected, regions exist.

All previously described junction elements have one thing in common, namely, that they can be freely rotated with respect to the corrugated tube surrounding the cable harness, so that torsional stresses in the corrugated tube are priori excluded even in the case of an unfavorable installation position of the arrangement or of individual sockets with differing pin arrangements or coding.

Figure 5:
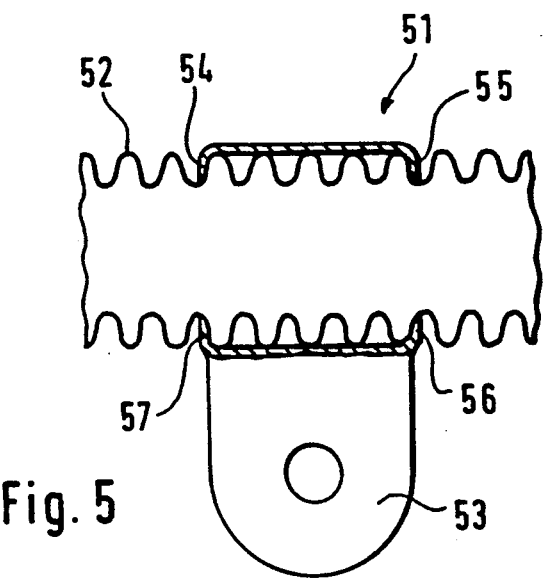
FIG. 5 shows the design of a clamp for a connection to to a ground point for the harness of FIG. 1.

A simplified design of a clamp or tube clamp fitting 51 is shown in FIG. 5, by means of which a tube 52 can be connected with a structure of the aircraft so as to be grounded to the airplane body. For this purpose an extension 53 is provided. In order to achieve a positively locking connection between the tube 52 and the clamp 51, portions of the edges 54, 55, 56, 57 of the clamp 51 are bent inwards in the region of the tube 52 and engage into the appropriate grooves of the corrugated tube 52. This measure reduces the fabrication costs of the clamp 51.

FIG. 6 illustrates one modified embodiment similar to that of FIG. 1. The same reference numerals are employed as in FIG. 1 for similar elements. This embodiment differs from the previous embodiments in that the separate protective over-braiding is replaced by a protective layer provided on the inside surface of the profiled convoluted tube 4. This is more clearly illustrated in FIG. 7, which shows a detail of the circle II in FIG. 6. Here the wall thickness of the profiled tube 12 is shown on a larger scale. Furthermore, the diagram shows a layer 100 adhering tightly to the inner side of the tube 12, the layer being of a suitable material and serving as a protection against chafing. The layer 100 protects the sheathing of the individual lines against abrasion especially whenever vibrations occur. For this purpose, the layer 100 can consist of any plastic material or of an elastomer. In a preferred embodiment of the invention the layer 100 consists of polytetrafluoroethylene. The layer 100 can be applied in various known ways to the inside of the tube 4, before assembly, such as by coating, spraying or dipping.

The invention also offers a way of simplifying the fabrication of the half shells, the branching elements, the connector elements, as well as the molded pieces. This simplification compared to the previous embodiments can, for instance, consist in equipping the elements concerned, per junction or connection with the end of a tube, merely with one bead engaging into an outer groove of the tube 4.

FIG. 8 shows an example for a branch-out element 101 which is adapted at its free ends to the external shape of the profiled tubes 11, 12, 13, only to such an extent that in this case flanges 102 to 104 are provided engaging respectively into one of the outer grooves of the profiled tubes. With this change, the regions of the branch-out elements 15 which come into contact with the outer surface of the profiled tube 4 are at least partially adapted or matched to the outer shape of the profiled tube 4. The branch-out element 101 fabricated out of sheet metal consists of two half cylinders or shells and for the rest of it has mainly a smooth surface due to the elimination of several beads fabricated typically by deep drawing. The half shells are connected tightly with the tube elements 11, 12, 13 by three clamping elements 105 to 107. Another refinement of the invention consists in that the flanges 102 to 104 consist of individual bent-over lugs. The improvement made with respect to this branching element are obviously also applicable to the connectors and molded parts, illustrated, for example, at 14, 40, and 47 in FIGS. 1 and 4. An advantage of this simplified construction is lower tooling costs and lower fabrication cost of the harness elements.

FIG. 9 shows a modified detail II of FIG. 6 in accordance with a further embodiment of the invention. Here, again, the wall thickness of the profiled hose 12 is shown on a magnified scale. Furthermore, the drawing shows several electrical lines 8 and chafing protection means 111 arranged between the profiled hose 12 and the lines 8. The chafing protection means 111 is constructed in accordance with this aspect of the invention as a hose or tube. Thus, it is assured that the lines 8 can be easily pushed or pulled into the profiled hose 12 previously provided with the chafing protection means 111.

In a preferred embodiment of this aspect of the invention, the chafing protection means 111 is fabricated from a suitable fiber material, with its diameter stabilized in such a way that it is largely independent of, i.e., does not substantially vary when subjected to, longitudinal forces. Since the arrangement must be able also to function at higher temperatures, ceramic- and mineral-fibers are especially suitable as materials. Examples of such suitable fiber materials are: ceramic fibers such as Nextel 312 ® fibers, and mineral fibers such as glass or silica-fibers.

In a hose-shaped chafing protection means 111 consisting of fiber material, the required stabilization of the diameter can be achieved by connecting the fibers or fiber strands with each other by means of appropriate well-known measures of textile technology. This can, for instance, be achieved by weaving or knitting. For example, a fiber tube can be constructed with a diameter that will substantially not vary when the tube is pushed or pulled, by weaving fibers and stabilizing them by impregnating with a suitable binder.

A similarly stabilized tube can be manufactured by knitting only. Knitting itself results in hoses or tubes with stabilized diameters.

A simple hose-shaped braiding, which in itself has an unstable diameter, can also be provided with a predetermined fixed diameter by impregnating the fiber hose concerned with a suitable binder, for instance, with silicone rubber. Silicone rubber is distinguished by an outstanding temperature resistance. For example, a braiding made from glass will not be dimensionally stable, but when impregnated with silicone rubber it will be stable. Another stabilizing impregnant is a nonflammable varnish such as used in fabricating FILOTEX ® BRAIDS.

The chafing protection means 111 has preferably a low friction coefficient compared to the lines 8 and the profiled hose 12. Therefore, it is preferred that the fiber hose be impregnated with a binder having a low friction coefficient. An example of such a binder is polytetrafluoroethylene, PTFE, known as TEFLON ®.

If cost considerations are more important than temperature behavior in selecting the material, routine textile fibers or synthetic fibers can be utilized instead of the previously mentioned temperature-resistant fibers.

It is also possible to use a suitable plastic material hose as the chafing protection means 111. Here also there exists a possibility of selecting appropriate materials depending upon the requirements. A possible embodiment consists in designing the chafing protection means 111 as a shrunken hose. An example is KYNAR ®, a product of RAYCHEM.

An advantage of this aspect of the invention is that the assembly of the protected cable using the improved chafing protection means of the invention lends itself easily to mass production processes. An example would be the introduction of braiding into a profiled hose, which can be done by pushing-in procedures.

The invention is not limited to the depicted and described examples. It extends rather to all embodiments which are conceivable within the framework of the claims and in combination with the various features described herein. Thus, while the invention has been described in connection with preferred embodiments, it will be understood that modifications thereof within the principles outlined above will be evident to those skilled in the art and thus the invention is not limited to the preferred embodiments but is intended to encompass such modifications.

NEXTEL 312 ® is a product of 3M, a company of the U.S.; FILOTEX ® is a product of Filotex, a company of France; and TEFLON ® is a product of DuPont, a company of the U.S. An example of a knitted hose is MARFLEX 710 ®, a product of DETAKTA, a company of Germany. MARFLEX 710 has been impregnated by silicone elastomeric resin to overcome unraveling.

I claim:

1. An electrical harness for electrical interconnection of electrical installations and or protecting same against electromagnetic disturbances including overvoltages and lightning strikes, comprising a plurality of electrical lines, a metallic corrugated tube surrounding the electrical lines, a junction element connected to the electrical lines, a sleeve member connected to the junction element and surrounding the corrugated tube, means for clamping the sleeve member to the corrugated tube, and means arranged between the corrugated tube and the electrical lines and serving to protect the latter against chafing, said chafing protection means comprising a hose constituted of textile fibers.

2. Electrical harness according to claim 1, wherein the harness comprises at an intermediate position a dividing or branch element having an inside structure corresponding to and embracing the external shape of the corrugated tube.

3. Electrical harness according to claim 1, wherein the harness comprises at an intermediate position a connector element having an inside structure corresponding to and embracing the external shape of the corrugated tube.

4. Electrical harness according to claim 1, wherein the corrugated tube has grooves, further comprising a branching element or connector element connected to the corrugated tue, the branching element or the connector element being configured to engage grooves of the corrugated tube.

5. Electrical harness according to claim 4, wherein the branching element or the connector element comprises a bead, which bead engages into a groove of the corrugated tube.

6. Electrical harness according to claim 34, wherein the branching element or he connector element comprises a flange for connection with the corrugated tube and which engages into a groove of the tube.

7. Electrical harness according to claim 6, wherein the flange comprises individual bent-over lugs.

8. Electrical harness according to claim 1, characterized in that the chafing protection means has a diameter that is stabilized such that it is largely independent of possible arising longitudinal for es.

9. Electrical harness according to claim 8, characterized in tha the fibers of the chafing protection means are connected with each the by knitting or weaving.

10. Electrical harness according to claim 9, characterized in that the hose is impregnated with a binder.

11. Electrical harness according to claim 9, characterized in tha the hose is impregnated with silicone rubber.

12. Electrical harness according to claim 9, characterized in that the

13. Electrical harness according to claim 1, characterized in that the chafing protection means is a shrunk-on tubing.

14. An electrical harness for electrical interconnection of electrical installations and for protecting same against electromagnetic disturbances, comprising a plurality of electrical lines, a metallic corrugated tube surrounding the electrical lines, a junction element connected to the electrical lines, a sleeve member connected to the junction element and surrounding the corrugated tube, means for clamping the sleeve member to the corrugated tube, means arranged between the corrugated tube and the electrical lines and serving to protect the latter against chafing, said chafing protection means comprising an overbraiding of plastic material, and means of relectrically connecting the metallic tube to a ground point, said corrugated tube being rotatably connected with the junction element, said junction element being in the form of a plug-in connector arranged at the end of the electrical lines.

15. An electrical harness for electrical interconnection of electrical installations and for protecting same against electromagnetic disturbances, comprising a plurality of electrical lines, a metallic corrugated tube surrounding the electrical lines, a junction element connected to the electrical lines, a sleeve member connected to the junction element and surrounding the corrugated tube, means for clamping the sleeve member to the corrugated tube, means arranged between the corrugated tube and the electrical lines and serving to protect the latter against chafing, said chafing protection means comprising an overbraiding of plastic material, and means for electrically connecting the metallic tube to a ground point, said junction element comprising a plug-in connector, said sleeve member comprising divided half shells provide on their inside with a profile corresponding to the outer face of the tube.

16. An electrical harness for electrical interconnection of electrical installations and for protecting same against electromagnetic disturbances, comprising a plurality of electrical lines, a metallic corrugated tube having grooves and surrounding the electrical lines, a junction element connected to the electrical lines, a sleeve member connected to the junction element and surrounding the corrugated tube, means for clamping the sleeve member to the corrugated tube, means arranged between the corrugated tube and the electrical lines and serving to protect the latter against chafing, said chafing protection means comprising an overbraiding of plastic material, and means of relectrically connecting he metallic tube to a ground point, said clamping means comprising an extension constituting the means for electrically connecting the metallic tube to a ground point, said clamping means further comprising inwardly-bent edge zones engaging into grooves of the corrugated tube.

* * * * *